3,079,378
ACYLATED PSICOFURANOSYLADENINES
William Schroeder, Pavilion Township, Kalamazoo County, Charles Lewis, Kalamazoo, Herman Hoeksema, Kalamazoo Township, Kalamazoo County, Thomas E. Eble, Kalamazoo, and Brian Bannister, Kalamazoo Township, Kalamazoo County, Mich., assignors to The Upjohn Company, Kalamazoo, Mich., a corporation of Delaware
No Drawing. Filed Feb. 1, 1960, Ser. No. 5,640
7 Claims. (Cl. 260—211.5)

This invention relates to novel derivatives of 9-D-psicofuranosyladenine and is more particularly concerned with acyl derivatives formed by the latter compound with hydrocarbon carboxylic acids.

This application is a continuation-in-part of application Serial No. 788,746, filed January 26, 1959, now abandoned, and application Serial No. 720,066, filed March 10, 1958, now U.S. Patent 3,020,274.

The novel compounds of the invention can, for the most part, be represented by the following general formula:

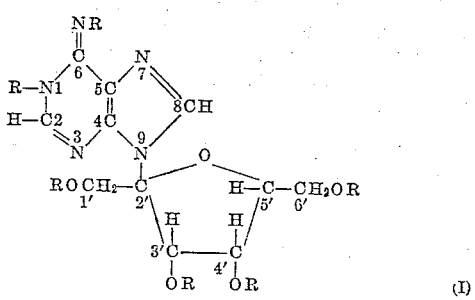

wherein R is selected from the group consisting of hydrogen, a hydrocarbon carboxylic acid acyl radical containing from one to twelve carbon atoms, inclusive, and a halo-, nitro-, hydroxy-, amino-, cyano-, thiocyano- and lower alkoxy-substituted hydrocarbon carboxylic acid acyl radical containing from one to twelve carbon atoms, inclusive, provided that not all the groups R may represent hydrogen simultaneously. It is to be noted that, when the group R in the 1-position in the purine moiety of the compounds having the above general Formula I is a hydrogen atom, the compound may exist in the tautomeric form represented by the following general formula:

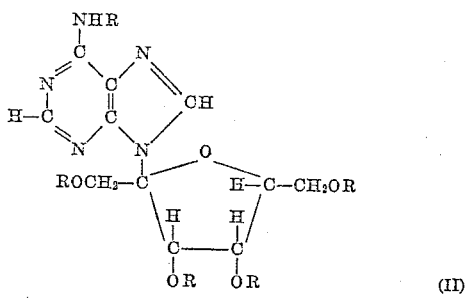

It is to be understood that, whenever reference is made throughout the specification and claims to the novel compounds having the general Formula I above, such reference is to be interpreted as including, where applicable, compounds having the tautomeric Formula II above.

The term "hydrocarbon carboxylic acid acyl radical containing from one to twelve carbon atoms" whenever used in the specification or claims is intended to mean an acyl radical corresponding to a hydrocarbon carboxylic acid containing from one to twelve carbon atoms, inclusive. Suitable such acids include (a) a saturated or unsaturated, straight or branched chain aliphatic carboxylic acid such as acetic, propionic, butyric, isobutyric, tert-butyl-acetic, valeric, isovaleric, caproic, caprylic, decanoic, dodecanoic, acrylic, crotonic, hexynoic, heptynoic, octynoic acids, and the like; (b) a saturated or unsaturated cycloaliphatic carboxylic acid such as cyclobutane-carboxylic acid, cyclopentane-carboxylic acid, cyclopentene-carboxylic acid, methylcyclopentene-carboxylic acid, cyclohexane-carboxylic acid, dimethylcyclohexene-carboxylic acid, dipropylcyclohexane-carboxylic acid, and the like; (c) a saturated or unsaturated cycloaliphatic-substituted aliphatic carboxylic acid such as cyclopentane-acetic acid, cyclopentane-propionic acid, cyclopentene-acetic acid, cyclohexane-butyric acid, methylcyclohexane-acetic acid, and the like; (d) an aromatic carboxylic acid such as benzoic acid, toluic acid, naphthoic acid, ethylbenzoic acid, isobutylbenzoic acid, methylbutylbenzoic acid, and the like; and (e) an aromatic-aliphatic carboxylic acid such as phenylacetic acid, phenylpropionic acid, phenylvaleric acid, cinnamic acid, phenylpropiolic acid, and naphthylacetic acid, and the like.

The term "halogen-, nitro-, hydroxy-, amino-, cyano-, thiocyano-, and lower-alkoxy-substituted hydrocarbon carboxylic acid acyl radicals containing from one to twelve carbon atoms, inclusive" is intended to mean hydrocarbon carboxylic acid acyl radicals as hereinbefore defined which are substituted by one or more halogen atoms, nitro, hydroxy, amino, cyano, thiocyano, or lower-alkoxy groups. By "lower-alkoxy" is meant an alkoxy group containing from one to six carbon atoms, inclusive, such as methoxy, ethoxy, propoxy, butoxy, amyloxy, hexyloxy, and isomeric forms thereof. Examples of substituted hydrocarbon carboxylic acid acyl radicals falling within the above definition are the acyl radicals corresponding to chloroacetic acid, chloropropionic acid, bromobutyric acid, iodovaleric acid, chlorocyclohexane-carboxylic acid, o-, m-, and p-chlorobenzoic acid, anisic acid, salicylic acid, p-hydroxybenzoic acid, o-, m-, and p-nitrobenzoic acid, cyanacetic acid, thiocyanoacetic acid, cyanopropionic acid, lactic acid, glycine, and the like.

The novel compounds of the invention possess valuable pharmacological properties. More particularly, the compounds of the invention exhibit anti-bacterial activity. Illustratively, 9-D-psicofuranosyladenine tetra-O-acetate, and penta-acetyl- and hexa-acetyl-9-D-psicofuranosyladenine exhibit a high order of in vivo activity against the organism S. haemolyticus in mammals and other animals infected with the organism. The compounds of the invention have not yet been established as effective in human therapy. In addition, as will be more particularly described hereafter, the penta-acyl compounds of the invention (i.e., the compounds having the Formula II above in which each of the groups R represents a hydrocarbon carboxylic acid acyl group as hereinbefore defined) are intermediates in the preparation, by chemical synthesis, of the compound 9-D-psicofuranosyladenine. The latter compound, which is active as an antibiotic and anti-tumor agent, can be obtained as an elaboration product of the organism Streptomyces hygroscopius var. decoyicus as described in copending application Serial No. 720,066, filed March 10, 1958.

It is an object of the invention to provide the novel compounds having the general Formula I above. Other objects of the invention will be apparent to those skilled in the art.

The novel compounds of the invention can be prepared from 9-D-psicofuranosyladenine by methods which are well-known in the art for the conversion of hydroxyamino compounds to the corresponding acyl derivatives. Thus, the novel compounds having the Formula I above can be prepared advantageously by treating 9-D-psicofuranosyladenine with an acid halide or anhydride of the appropriate hydrocarbon carboxylic acid in the presence of a tertiary amine. Suitable tertiary amines include pyridine, quinoline, isoquinoline, trialkylamines such as trimethylamine, triethylamine, triisopropylamine, and the like, N,N-dialkylanilines such as dimethylaniline, diethylaniline, and the like, and N-alkyl-piperidines such as N-ethylpiperidine, N-methylpiperidine, and the like. The preferred base is pyridine. The reaction is effected in a convenient manner by treating a suspension of 9-D-psicofuranosyladenine in the tertiary amine with the acid halide or anhydride and heating the resulting mixture, if desired, for a short period at a temperature not greater than about 100° C. to complete the reaction. The reaction mixture can be decomposed in a simple and convenient manner by addition of water and the desired product isolated by conventional procedures.

By employing the acid halide or anhydride in a proportion of at least 6 moles per mole of 9-D-psicofuranosyladenine in the above reaction, there are obtained the compounds of Formula I above in which all of the groups R represent hydrocarbon carboxylic acid acyl radicals as hereinbefore. Advantageously the amount of acid halide or anhydride employed in the above reaction, when the fully acylated compounds are to be prepared, is greatly in excess of 6 moles per mole of 9-D-psicofuranosyl-adenin. Preferably the excess is of the order of 100 moles of acid halide or anhydride per mole of 9-D-psicofuranosyladenine. Even in the presence of an excess of acid halide or anhydride of the above order the desired fully acylated compound of the Formula I [i.e., all the groups R represent a hydrocarbon carboxylic acid acyl group as hereinbefore defined] will sometimes be obtained in admixture with a minor amount of the penta-acyl derivative, i.e., the compound of Formula II in which all the groups R represent a hydrocarbon carboxylic acid acyl group as hereinbefore defined. Such a mixture of the hexa- and penta-acyl compounds can be separated into its component parts by conventional methods, for example, by countercurrent distribution in a Craig apparatus using an appropriate solvent system. Thus by treating 9-D-psicofuranosyladenine with an amount of acetyl chloride or acetic anhydride of the order of 100 moles per mole of the psicoside in the presence of pyridine, there is obtained a mixture of penta-acetyl- and hexa-acetyl-9-D-psicofuranosyladenine, which mixture can be separated into its component parts by 600 transfers in a Craig countercurrent distribution aparatus using the solvent system of water: 95% ethanol: ethylacetate: cyclohexane in the ratio of 2:3: 2.75: 2.25 by volume.

When the molar ratio of acid halide or anhydride to 9-D-psicofuranosyladenine employed in the above reaction is less than 6:1 the reaction product normally will be a mixture of the partially acylated compounds (i.e., compounds of the Formula I in which one or more of the groups R represents hydrogen). Thus, by employing equimolar proportions of the acid halide or anhydride and 9-D-psicofuranosyladenine there can be obtained a mixture of the various possible monoacyl compounds, i.e., compounds of Formula I in which only one of the R groups is acyl, the remainder being hydrogen atoms. Such mixtures can be separated into their component parts by conventional procedures, for example, using the countercurrent distribution procedure discussed above, or using partition chromatography.

The compounds having the Formula I above in which the groups R in the 3'- and 4'-positions in the psicose moiety represent hydrocarbon carboxylic acyl groups as hereinbefore defined and the remainder of the groups R represent hydrogen atoms, can be obtained in a convenient manner as follows. Treatment of 9-D-psicofuranosyladenine with at least 3 molar proportions of trityl chloride in the presence of a tertiary amine as hereinbefore defined yields the 6:1':6'-tri-trityl derivative. The hydroxyl groups on the carbon atoms 3' and 4' of the psicose moiety are not converted to the trityloxy derivatives under these conditions due to steric factors. The tri-trityl derivative so obtained is then reacted under the conditions described above with the acid halide or anhydride of a hydrocarbon carboxylic acid as hereinbefore defined, to yield the corresponding 3':4'-diacyl tri-trityl derivative. The trityl groups are then removed, for example, by hydrogenolysis in the presence of a catalyst such as palladium-on-charcoal, to yield the desired 3':4'-diacyl-9-D-psicofuranosyladenine [i.e. compounds of the Formula I or II above in which the groups R in the 6-, 1'- and 6'-positions represent hydrogen and the groups R in the 3'- and 4'-positions in the psicose moiety represent hydrocarbon carboxylic acid acyl groups]. The 3':4'-diacyl-9-D-psicofuranosyladenines so obtained can then be acylated further by the process described above. By using an acylating agent, i.e., acid halide or anhydride, other than that used to acylate the trityl derivatives, there can thus be obtained compounds having the Formula I or II above which contain acyl groups in the 6-, 1'- and 6'-positions which differ from those in the 3'- and 4'-positions.

An alternative method for the preparation of the penta-acyl compounds of the invention, i.e., the compounds having the Formula II above in which each of the groups R represents a hydrocarbon carboxylic acid acyl group as hereinbefore defined, consists in the condensation of a chloromercuri-acyladenine with a tetraacyl-D-psicofuranosyl chloride or bromide (the acyl groups in the sugar and in the adenine being the same or different acyl groups of hydrocarbon carboxylic acids as hereinbefore defined) using the procedure described by Davoll and Lowy, J. Am. Chem. Soc. 73, 1650 (1951), for the preparation of 6-acetamido-9-tetraacetyl-$\beta$-D-glucopyranosyl-purine. The chloromercuri-acyladenines used as starting materials can be obtained from the corresponding acyl-adenine and mercuric chloride using the procedure of Davoll and Lowy (supra) who describe the preparation of the chloromercuri derivatives of acetyladenine (6-acetamidopurine) and benzoyladenine (6-benzamidopurine). The tetraacyl-D-psicofuranosyl chlorides and bromides can be obtained by procedures which are well known in the art. Thus, using essentially the procedure described by Fischer, Berichte, 44, 1899 (1911), for the preparation of tetraacetylglucosyl bromide, D-psicose is converted to its penta-acyl derivative by reaction with the appropriate acid anhydride and the penta-acyl derivative is reacted with hydrogen chloride or hydrogen bromide at a temperature of approximately 0° C. to yield the required tetraacyl-D-psicofuranosyl chloride or bromide. It is to be noted that the acylation of D-psicose will result in conversion of some of the furanose form of the psicose to the pyranose form and the resulting penta-acylate will give rise to a mixture of the desired chloride or bromide and tetraacyl-D-psicopyranosyl chloride or bromide. The latter (pyranose form) sugar chloride or bromide can be separated from the required chloride or bromide at this stage or, preferably, the mixture of the two chlorides or bromides can be reacted as such with the chloromercuri-acyladenine and the required product (furanose form) can be separated from the resulting mixture, for example, by the Craig countercurrent distribution method discussed above.

The penta-acyl compounds of the invention which are obtained by the latter procedure can then be converted by hydrolysis, for example, using methanolic ammonia as described by Davoll and Lowy (supra) to 9-D-psicofuranosyladenine. Hence the above method of preparing the penta-acyl compounds of the invention from the chloromercuri-acyladenines followed by hydrolysis of the penta-acyl compounds, forms a valuable synthetic route for the preparation of 9-D-psicofuranosyladenine by chemical means. This synthetic procedure is a valuable alternative to the preparation of the compound by fermentation described in copending application Serial No. 720,066, filed March 10, 1958. It will therefore be seen that the penta-acyl compounds of the invention, in addition to their importance as pharmacologically active agents, are valuable as intermediates in the chemical synthesis of 9-D-psicofuranosyladenine.

The esters of the invention are also useful as intermediates in the purification of 9-D-psicofuranosyladenine in which a crude product is esterified, the ester isolated and the 9-D-psicofuranosyladenine regenerated by hydrolysis.

The compounds of the invention can be combined with solid or liquid pharmaceutical carriers and formulated as tablets, powder packs, or capsules, or dissolved or suspended in suitable solvents, for oral or parenteral administration.

The following examples are illustrative of the process and products of the present invention, but are not to be construed as limiting.

EXAMPLE 1

*Penta-Acetyl and Hexa-Acetyl-9-D-Psicofuranosyladenine*

A suspension of 1.0 g. (0.00336 mole) of 9-D-psicofuranosyladenine in 125 ml. of anhydrous pyridine was treated slowly with stirring with 50 ml. (0.537 mole) of acetic anhydride, the temperature being maintained at 15 to 18° C. by cooling when necessary. The mixture so obtained was allowed to stand for 5 days at ambient laboratory temperature (approximately 20° C.) and was then treated with 20 g. of ice and stirred with cooling for 3 hours. The resulting mixture was evaporated to dryness under reduced pressure and the residue was dissolved in chloroform. The chloroform solution was washed with water and then with 3 N sulfuric acid before being evaporated to dryness. The residue was separated into two components by countercurrent distribution (600 transfers) in the system water: 95% ethanol: ethylacetate: cyclohexane in the ratio of 2:3: 2.75: 2.25 by volume respectively. The two components, which were isolated by evaporation of the solvent were as follows:

Component A (600 mg.) (K=0.40 in the above solvent system) was hexa-acetyl-9-D-psicofuranosyladenine in the form of an oil.

*Analysis.*—Calcd. for $C_{23}H_{27}N_5O_{11}$: C, 50.27; H, 4.95; N, 12.74; O, 32.03. Found: C, 50.53; H, 4.79; N, 13.35; O, 31.59.

Component B (200 mg.) (K=0.17 in the above solvent system) was penta-acetyl-9-D-psicofuranosyladenine in the form of an oil.

*Analysis.*—Calcd. for $C_{21}H_{25}N_5O_{10}$: C, 49.70; H, 4.97; N, 13.80; O, 31.53. Found: C, 49.44; H, 4.73; N, 14.06; O, 31.60.

EXAMPLE 2

*9-D-Psicofuranosyladenine Texabenzoate*

A suspension of 2.97 g. (0.01 mole) of 9-D-psicofuranosyladenine in 40 ml. of anhydrous pyridine was well stirred whilst 10 g. (0.0711 mole) of benzoyl chloride was added dropwise over a period of 1 to 2 minutes. The temperature rose to 65° C. The mixture was stirred for 45 minutes after returning to room temperature and was then heated for 10 minutes on the steam bath. A small quantity of water was added to the reaction mixture which was then poured into 300 ml. of water. The oil which separated was washed with several portions of hot water and was then dissolved in 175 ml. of hot ethanol. The alcoholic solution was allowed to cool to room temperature and, after standing for 3 hours at this temperature, the solid which had crystallized was isolated by filtration. The material so obtained was recrystallized from 95% ethanol. There was thus obtained hexabenzoyl 9-D-psicofuranosyladenine in the form of a crystalline solid having a melting point of 157 to 159° C.

*Analysis.*—Calcd. for $C_{53}H_{39}O_{11}N_5$: C, 69.05; H, 4.26; N, 7.60. Found: C, 68.79; H, 4.50; N, 8.03.

In similar manner, but replacing benzoyl chloride by propionyl chloride, isobutyryl chloride, valeryl chloride, isovaleryl chloride, tertiary-butylacetyl chloride, caproyl chloride, heptanoyl chloride, phenylacetyl chloride, toluoyl chloride, cyclopentylpropionyl chloride, cyclopent-1-enylpropionyl chloride, cyclohexylacetyl chloride, acrylyl chloride, crotonyl chloride, hex-2-yn-1-oyl chloride, oct-2-yn-1-oyl chloride, chloroacetyl bromide, p-chlorobenzoyl chloride, anisoyl chloride, salicyloyl bromide, p-nitrobenzoyl chloride, and cyanoacetyl chloride, there were obtained 9-D-psicofuranosyladenine hexapropionate, hexaisobutyrate, hexavalerate, hexaisovalerate, hexa-tertiarybutylacetate, hexacaproate, hexaheptanoate, hexaphenylacetate, hexatoluate, hexacyclopentylpropionate, hexacyclopent-1-enylpropionate, hexacyclohexylacetate, hexacrylate, hexacrotonate, hexahex-2-yn-1-oate, hexaoct-2-yn-1-oate, hexachloroacetate, hexa-p-chlorobenzoate, hexa-anisate, hexa-salicylate, hexa-p-nitrobenzoate, and hexa-cyanoacetate, respectively.

EXAMPLE 3

*Penta-Acetyl-9-D-Psicofuranosyladenine and 9-D-Psicofuranosyladenine*

(A) TETRA-ACETYL D-PSICOFURANOSYL CHLORIDE

A solution of 3 g. (0.0166 mole) of D-psicose in 15 ml. (0.161 mole) of acetic anhydride was allowed to stand at 2° C. for 2 hours and then for an additional 20 hours at room temperature. The resulting solution was poured into ice-water and the oil which separated was extracted with chloroform. The chloroform solution was washed successively with 3 separate 150 ml. portions of N hydrochloric acid, one portion of saturated aqueous sodium bicarbonate solution and finally with water. The chloroform solution was then dried over anhydrous magnesium sulfate, filtered, and the filtrate evaporated to dryness in vacuo at 40° C. There was thus obtained 5.8 g. of D-psicose penta-acetate in the form of a yellow oil; $[\alpha]_D^{24}=+7.5°$ (c.=2.2 in ethanol).

A solution of 3.0 g. of the penta-acetate so obtained, in 115 ml. of absolute ether was maintained at 0° C. and saturated with dry gaseous hydrogen chloride. The solution was then allowed to stand at 2° C. for 42 hours after which the ether and hydrogen chloride were removed by distillation under reduced pressure at 20° C. The last traces of hydrogen chloride were removed from the residue by treating the latter with several small portions of carbon tetrachloride and benzene, each portion being removed by distillation under reduced pressure. There was thus obtained tetra-acetyl D-psicofuranosyl chloride in the form of a yellow oil.

(B) PENTA-ACETYL-9-D-PSICOFURANOSYLADENINE

The tetra-acetyl D-psicofuranosyl chloride prepared as described above was dissolved in a small quantity of anhydrous xylene and the solution was added to an anhydrous suspension of 4 g. of chloromercuri acetyladenine [Davoll and Lowy (supra)] in 100 ml. of xylene. The mixture was heated under reflux with stirring for 3 hours, and the resulting suspension was filtered while hot. The filtrate was evaporated to dryness under reduced pressure. The residue was purified by countercurrent extraction (600 transfers) in the system water: 95% aqueous ethanol: ethyl acetate: cyclohexane in the ratio by volume of 2:3: 2,75: 2.25, respectively. There was thus obtained penta-acetyl 9-D-psicofuranosyladenine (K=0.17 in the above solvent system) in the form of an oil.

In similar manner, by employing chloromercuri-benzoyladenine [Davoll and Lowy (supra)] in place of chloromercuri-acetyladenine in the above reaction, there was prepared 9-(tetraacetyl-D-psicofuranosyl)benzoyladenine. Similarly, by employing tetrabenzoyl D-psicofuranosyl chloride in place of tetraacetyl D-psicofuranosyl chloride in the above reaction, there was prepared 9-tetrabenzoyl-D-psicofuranosyl)acetyladenine.

(C) 9-D-PSICOFURANOSYLADENINE

The 9-D-psicofuranosyladenine penta-acetate prepared as described above was treated with 100 ml. of methanol saturated with ammonia at 0° C. The resulting mixture was allowed to stand at 0° C. for 18 hours. The solid which had separated was removed by filtration and the filtrate was evaporated to dryness under reduced pressure at 30° C. The residual brown solid was subjected to 985 transfers in a Craig countercurrent distribution machine using a solvent system of butanol: water. The tubes containing the peak at K=0.3 were combined and evaporated to dryness in vacuo. The residue was dissolved in 50% aqueous acetone, treated with decolorizing charcoal, evaporated almost to dryness and allowed to stand overnight. The crystalline material was separated from supernatant liquor on a porous tile and recrystallized from 50% aqueous acetone. There was thus obtained 9-D-psicofuranosyladenine in the form of a crystalline solid having a melting point of 190 to 195° C.; $[\alpha]_D^{24} = -55°$ ($c. = 0.5$ in dimethylsulfoxide).

EXAMPLE 4

9-D-Psicofuranosyladenine Tetra-O-Acetate

To a solution of 20 g. (0.0673 mole) of 9-D-psicofuranosyladenine in 140 ml. of pyridine at 0 to 10° C. was slowly added a solution of 32 ml. (0.336 mole) of acetic anhydride in 30 ml. of pyridine. The mixture was permitted to come to room temperature during the next 16 hours and was then distilled to dryness at a pressure of less than 1 mm. of mercury. The residue crystallized when triturated with ethanol; yield 25.5 g.; M.P. 73–78° C. Recrystallization from ethanol gave 24.5 g. (79%) of crystalline 9-D-psicofuranosyladenine tetra-O-acetate melting at 83 to 86° C.; $[\alpha]_D = -28°$ ($c.=1.0$ in ethanol.

*Analysis.*—Calcd. for $C_{19}H_{23}N_5O_9$: C, 49.04; H, 4.98; N, 15.05. Found: C, 48.95; H, 5.83; N, 15.00.

We claim:

1. A compound having the general formula:

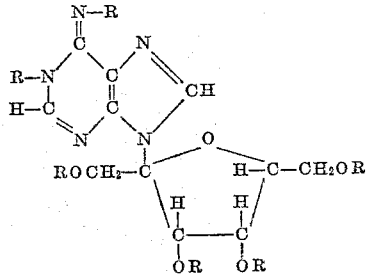

wherein one of the groups R is selected from the class consisting of a hydrocarbon carboxylic acid acyl radical containing from 1 to 12 carbon atoms, inclusive, and a halo-, nitro-, hydroxy-, amino-, cyano-, thiocyano-, and lower-alkoxy substituted hydrocarbon carboxylic acid acyl group containing from 1 to 12 carbon atoms, inclusive, and the remainder of the groups R are selected from the group consisting of hydrogen, a hydrocarbon carboxylic acid acyl radical containing from 1 to 12 carbon atoms, inclusive, and a halo-, nitro-, hydroxy-, amino-, cyano-, thiocyano- and lower-alkoxy-substituted hydrocarbon carboxylic acid acyl group containing from 1 to 12 carbon atoms, inclusive.

2. Hexa-acetyl-9-D-psicofuranosyladenine.
3. Penta-acetyl-9-D-psicofuranosyladenine.
4. Hexa-benzoyl-9-D-psicofuranosyladenine.
5. 9-D-psicofuranosyladenine tetra-O-acetate.
6. A compound having the general formula:

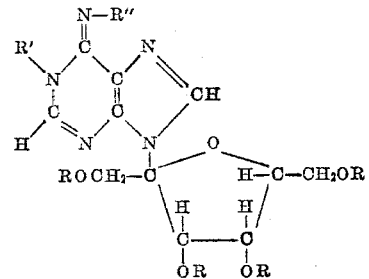

wherein R represents a hydrocarbon carboxylic acid acyl radical containing from 1 to 12 carbon atoms, inclusive, and R' and R" are selected from the class consisting of hydrogen and a hydrocarbon carboxylic acid acyl radical containing from 1 to 12 carbon atoms, inclusive.

7. 9-D-psicofuranosyladenine tetra-O-acylate wherein the acyl radical is a hydrocarbon carboxylic acid acyl radical containing from 1 to 12 carbon atoms, inclusive.

References Cited in the file of this patent

Yuntsen: Jr. of Antibiotics, Ser. A., Japan, pages 244–9, November 1958.